(No Model.)
M. H. KINSLEY.
SASH CORD FASTENER.
No. 376,314. Patented Jan. 10, 1888.
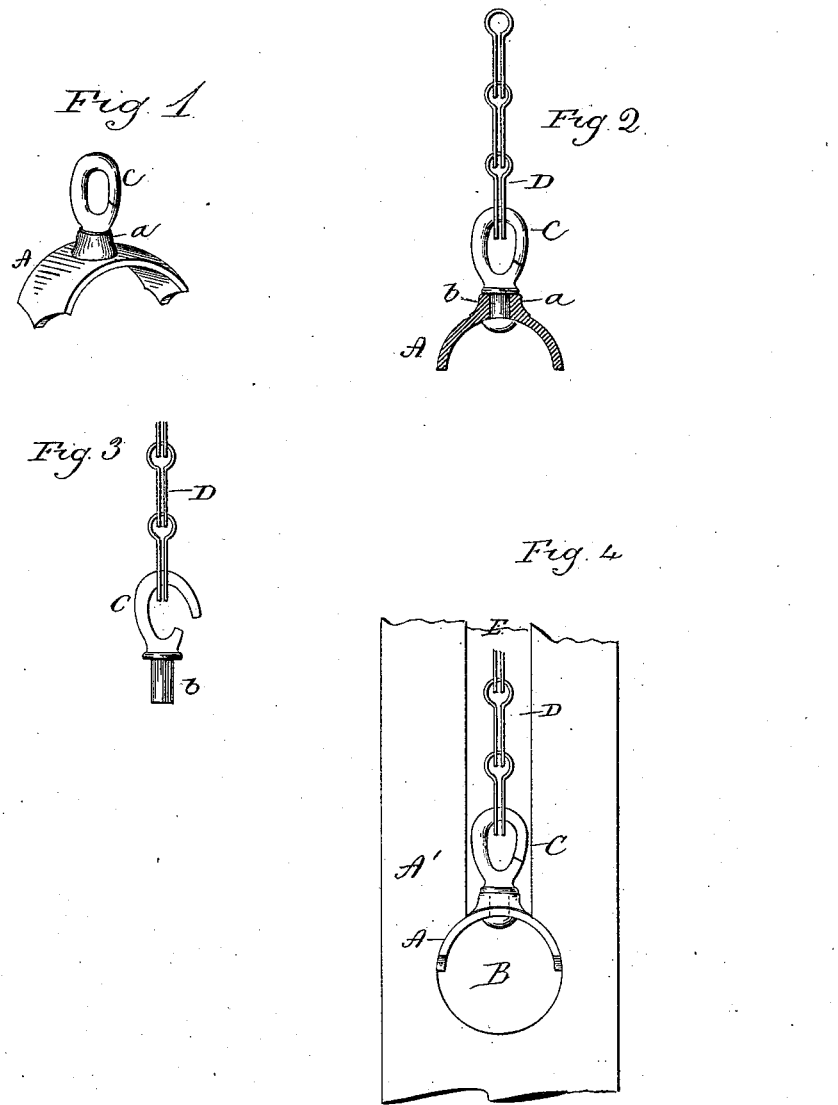

UNITED STATES PATENT OFFICE.

MYRON H. KINSLEY, OF NIAGARA FALLS, ASSIGNOR TO THE ONEIDA COMMUNITY, (LIMITED,) OF COMMUNITY, NEW YORK.

SASH-CORD FASTENER.

SPECIFICATION forming part of Letters Patent No. 376,314, dated January 10, 1888.

Application filed September 19, 1887. Serial No. 250,067. (No model.)

*To all whom it may concern:*

Be it known that I, MYRON H. KINSLEY, of Niagara Falls, in the county of Niagara and State of New York, have invented a new Improvement in Sash-Cord Fasteners; and I do hereby declare the following, when taken in connection with accompanying drawings and the letters of reference marked thereon, to be a full, clear, and exact description of the same, and which said drawings constitute part of this specification, and represent, in—

Figure 1, a perspective view of the fastener complete; Fig. 2, a vertical central section through the socket, showing the swivel in side view with the chain attached; Fig. 3, the swivel detached; Fig. 4, an edge view of a sash, showing the cord-fastener as applied.

This invention relates to a device for attaching window-weight cords to the sash, having for its object the construction of a simple and cheap device which will readily adapt itself to the seat for the fastener formed in the sash.

A represents the socket, which is adapted for attachment to the sash. This socket is of segment shape, corresponding to the recess B, bored in the sash A' to receive it. Vertically through the segment a swivel, C, is introduced. This is best done by forming an enlargement, *a*, on the top of the segment, with a hole through the enlargement, and with the shank *b* of the swivel C extending through the hole in the segment and riveted down upon the inside. This swivel is cast, as seen in Fig. 3, in the form of an open hook, so that the chain D may be attached to the hook while the hook is open, as seen in Fig. 3, and then the hook closed, as seen in Fig. 2, to prevent the detachment of the chain. The swivel makes firm engagement between the chain and the segment. The segment takes its bearing in the recess B in the sash, while the swivel and chain extend up through the groove E in the sash.

The socket and the swivel may both be cast separately and then united; or the socket may be cast onto the shank of the swivel, but so as to permit the swivel to turn freely in the socket.

By making the hook-connection in the form of a swivel, so as to turn freely in the socket, twist of the chain is permissible without displacement of the socket, the swivel readily rotating under any twisting action of the chain.

The construction is very simple and of the cheapest possible character, yet durable and effective.

I do not claim, broadly, a metallic segment combined with the chain as a means for securing the cord to a sash, as such, I am aware, is not new; but What I do claim is—

A sash-chain fastener composed of the segment A, adapted to rest in a recess in a sash edge, combined with the hook C, swiveled to freely turn in said segment and adapted to secure the end of the sash-chain, substantially as described.

MYRON H. KINSLEY.

Witnesses:
W. CARYL ELY,
FRANK A. DUDLEY.